Figure 1:
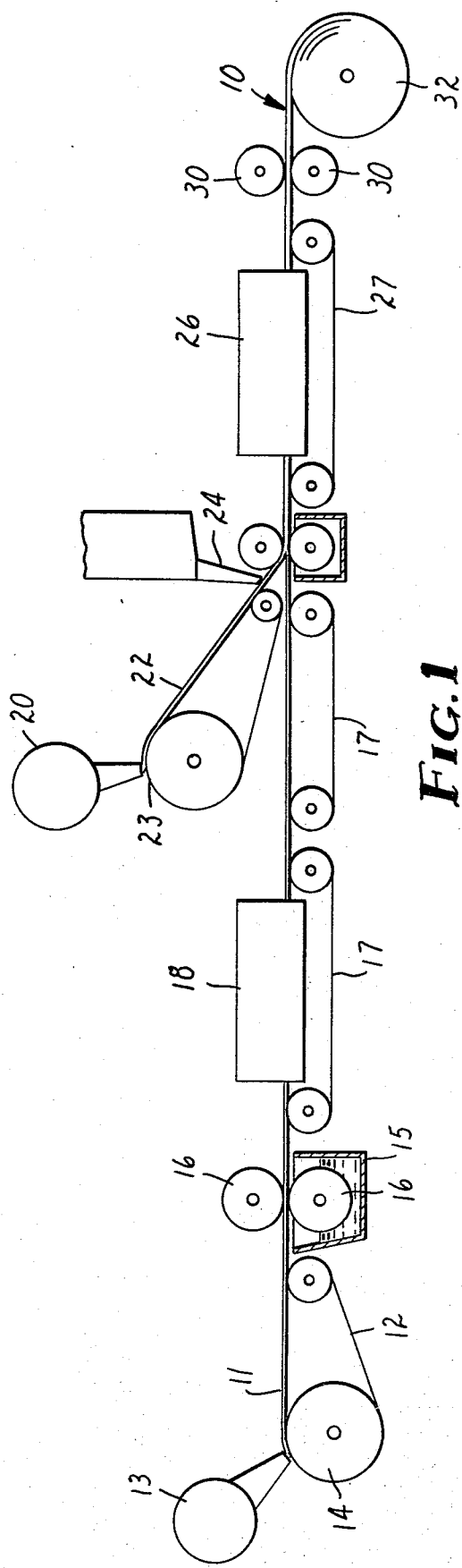

United States Patent [19]

Riedel et al.

[11] 4,292,360
[45] Sep. 29, 1981

[54] PRESSURE SENSITIVE ADHESIVE TAPE

[75] Inventors: John E. Riedel, White Bear Lake; Paul G. Cheney, Woodbury, both of Minn.

[73] Assignee: Minnesota Mining and Manufacturing Company, St. Paul, Minn.

[21] Appl. No.: 127,390

[22] Filed: Mar. 5, 1980

[51] Int. Cl.³ .......................... B32B 7/04; B32B 5/22; B32B 31/08
[52] U.S. Cl. ..................... 428/171; 156/628; 156/278; 156/296; 428/220; 428/280; 428/282; 428/284; 428/290; 428/297; 428/298; 428/299; 428/302; 428/303; 428/343; 428/354
[58] Field of Search ............... 428/156, 170, 171, 172, 428/212, 213, 220, 284, 286, 287, 289, 290, 297, 298, 302, 303, 343, 354, 227, 236, 280, 282; 156/62.8, 278, 296

[56] References Cited

U.S. PATENT DOCUMENTS

| | | | |
|---|---|---|---|
| 3,121,021 | 2/1964 | Copeland | 428/343 |
| 3,215,589 | 11/1965 | Heller et al. | 162/124 |
| 3,364,063 | 1/1968 | Satas | 428/343 |
| 3,384,330 | 5/1968 | Rollins | 244/46 |
| 3,575,782 | 4/1971 | Hansen | 128/290 |
| 3,629,047 | 12/1971 | Davison | 15/209 |
| 3,660,222 | 5/1972 | Fleming et al. | 428/302 |
| 3,772,124 | 3/1973 | Mayer | 156/324 |
| 3,809,077 | 5/1974 | Hansen | 128/290 |
| 3,842,832 | 10/1974 | Wideman et al. | 156/229 |
| 3,905,864 | 9/1975 | Curry et al. | 162/132 |
| 3,952,124 | 4/1976 | Mesek | 428/218 |
| 3,956,048 | 5/1976 | Nordgren | 156/62.8 |
| 4,055,698 | 10/1977 | Berry | 428/286 |
| 4,142,016 | 2/1979 | Perry | 428/302 |
| 4,158,713 | 6/1979 | Degens | 428/286 |

Primary Examiner—James J. Bell
Attorney, Agent, or Firm—Cruzan Alexander; Donald M. Sell; Carolyn A. Bates

[57] ABSTRACT

A multi-ply non-woven sheet material and pressure-sensitive adhesive tape made therefrom are disclosed. The sheet material comprises a first layer of randomly interlaced fibers bonded to each other by a rewettable binder and at least one additional layer of randomly interlaced fibers bonded to each other and to the first layer by a rewettable binder. The fibers of the additional layer are laid directly on the first layer prior to application of the binder to the additional layer whereby the binder bonds the fibers of the additional layer to each other and to the first layer.

11 Claims, 2 Drawing Figures

U.S. Patent  Sep. 29, 1981  4,292,360

PRESSURE SENSITIVE ADHESIVE TAPE

This invention relates to tapes, and more particularly to an improved backing for tapes comprised of a plurality of layers which exhibits improved tear, tensile and elongation properties.

Cloth tapes comprising a backing of a woven textile fabric such as cotton coated with a pressure-sensitive adhesive have found wide applicability in both the medical and electrical fields. In the medical field, cloth tapes are used to mechanically retain bulky medical dressings or medical appliances used for therapeutic or monitoring purposes on the body of the patient. In the electrical field cloth tapes are utilized to isolate or insultate groupings of electrical wires or components. Cloth tapes are preferred in many cases to tapes having nonwoven backings because of their tensile and elongation properties which permit substantially more pressure to be applied to the tape without stretching. Cloth tapes offer the additional advantage of being tearable or rippable in a straight line, normally along or across one or other lines of weave. This feature is desirable especially to hospital personnel when scissors or other cutting implements are not handy.

In a medical setting when it is expected that the tape will be in place for an extended period of time or if some measure of aesthetic appeal is desired, cloth tapes known as "silk" tapes are utilized. "Silk" tapes generally have a backing of acetate taffeta cloth which contains a rather intricate weave pattern which imparts an aesthetic appeal while at the same time inhibiting unravelling. Silk tapes exhibit similar tensile and tear properties as other cloth tapes but at a substantial increase in cost. These more expensive silk tapes are used in the electrical field by many original equipment manufactures. It has been found that silk tapes render copper wires more corrosion-resistant than cloth tapes having a woven cotton backing.

Prior to the present invention, tape backings comprised of non-woven webs were known. For example, U.S. Pat. No. 3,121,021 describes a breathable surgical adhesive tape preferably formed with a single-ply backing comprising a non-woven compacted tissue of interfaced staple rayon textile fibers which is unified by inpregnation with a water-insoluble rubbery fiber-binder sizing agent that coats the individual fibers and bonds them together at their crossing points. Although such a tape exhibits some of the properties of cloth tapes, its modulus (combination of tensile strength and elongation properties) is lower than that of cloth tapes, and it requires more force to finger-tear from a roll.

Applicant has surprisingly found a tape backing comprised of at least two layers of nonwoven fabric which, when formed into a tape, has a significantly superior modulus of elasticity than those tapes of the prior art made of similar materials at a comparable thickness. This superior modulus allows the tape to undergo higher initial stress loading in use without stretching. Further, applicant has unexpectedly found that tapes according to his invention can be made to have an appearance similar to silk tapes at a substantially reduced cost, and that pieces of the tape can be torn from the roll with force comparable to cloth tape. Thus, Applicant's tape achieves the desirable feel and appearance of cloth tapes having a woven backing, as well as the strength and tear properties of such tapes, using a less expensive nonwoven backing.

The prior art is replete with examples of nonwoven webs which are laminated in some manner. Generally, such laminates involve bonding a non-woven web to a layer of dissimilar material to achieve a laminate exhibiting the favorable properties of each material. U.S. Pat. No. 3,952,124 describes a 2-ply laminate made from two similar, but not homogeneous, nonwoven webs. Each web has a distribution gradient of long and short fibers across its thickness. The webs are bonded together with the short-fiber face of one touching the short-fiber face of the other to form a laminate having top and bottom surfaces richer in longer fibers than shorter fibers. U.S. Pat. No. 3,956,048 discloses a laminate comprising two non-woven webs wherein the fibers of one layer are oriented perpendicular to the fibers of the other layer.

Prior to the present invention, it was unappreciated that homogeneous and substantially identical nonwoven webs could be laminated together, in the manner described herein, to provide a sheet material having significantly improved properties over a single-ply nonwoven web of comparable thickness.

According to the present invention there is provided a pressure sensitive tape comprising a conformable sheet material having a layer of pressure-sensitive adhesive thereon. The sheet material is comprised of (1) a first layer which is a nonwoven web of randomly interlaced fibers bonded to each other by a binder dispersed therethrough and (2) at least one additional layer formed on the first layer whereby a binder which is dispersed in the additional layer bonds the interlaced fibers of the additional layer to each other and to the fibers of the first layer. As a result of the aforementioned formation process, the layers are not readily separable across their common surfaces.

Figure 2:
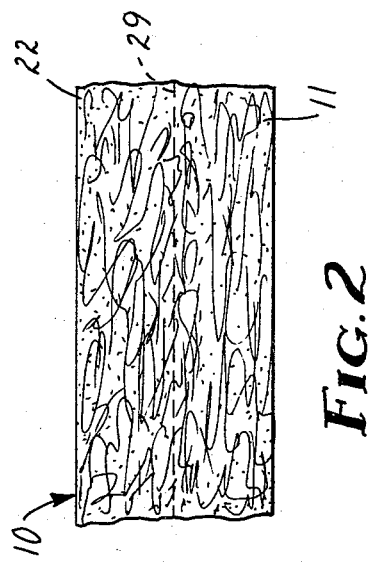

A better understanding of the present invention will be obtained with reference to the accompanying drawings wherein:

FIG. 1 is a schematic representation showing the manufacture of the sheet material of the present invention; and FIG. 2 is a representation of an edge view of a portion of the sheet material of the present invention.

As shown in FIG. 1, the sheet material 10 is made by forming a first layer 11 of a web of air-laid randomly interlaced fibers on conveyor belt 12 by means of web making machine 13 and condenser 14 in the conventional manner. The randomly interlaced fibers are then passed through a squeeze roll applicator 16 which disperses a fluid binder from trough 15 throughout the matrix of the web. The binder-containing web is passed via conveyor system 17 through a drying oven 18 where the binder solvent is removed, and thence under a second web former 20 where an additional web 22 of randomly interlaced fibers is formed on a condenser conveyor system 23 and conveyed to a position on top of first layer 11 to form a composite web. The composite web is next passed through a second binder applicator 24 which disperses binder throughout the matrix of the composite web, and from there to drying oven 26 to facilitate removal of the binder solvent and crosslinking of the binder. The dried composite web is conveyed via conveyor 27 to hot roller 30 where the web is compacted to its useful thickness and optionally embossed to impart a decorative texture. The embossed and compacted composite web 10 is then wound up to form stock roll 32.

As illustrated in FIG. 2, first layer 11 and second layer 22 form a homogeneous composite web 10 wherein layers 11 and 22 are not readily separable along their interface 29.

In drying the web by the application of heat to the web surfaces in drying ovens 18 and 26, there may be a tendency for the binder solution to migrate towards the heat source as the solvent carrier is evaporated. Reliance on surface heating as the sole means of drying may cause sufficient binder migration to adversely affect the strength of the interior of the composite web. It is therefore preferred that a portion of the drying process be carried out in a manner which makes heat available at the interior of the web such as heating by a strong current of hot air which brings heat to the interior of the web by convection.

In the above illustrative example, webs 11 and 22 are formed from a commercially available Rando-Web machine manufactured by Rando Machine Corp., Macedon, N.Y. One skilled in the art will recognize that if a web having a different fiber orientation is desired other machines could be utilized. For example, a Garnett machine manufactured by Proctor-Schwartz of Philadelphia, Pa., would be useful in this invention if increased orientation in the machine direction is desired. Fiber orientation within the web may be further influenced by the tension placed on the web by the various rollers and conveyors as is well known in the art.

The web may be comprised of a wide variety of fiber compositions, for example, staple fibers such as rayons, polyesters, cottons, wools, linens, acrylics, polyamides, individually or in blends. The web may also contain binder fibers as well as staple fibers. The ratio of staple fibers to binder fibers depends on the application to which the tape is put. In general, higher binder fiber content results in a backing which is more compacted, denser and stiffer. The length of the fiber used is influenced by the type of equipment available and is not critical to the invention. Generally fiber lengths between about ⅜ and 2 inches are used. The presently preferred fiber is a blend of polyester fibers comprised 85% by weight of 1.5 inch 1.8 denier polyester staple fiber, Fortrel® type 310, and 15% by weight 1.5 inch 3.0 denier polyester binder fiber, Fortrel® type 450. Both fibers are available from the Celanese Corporation of Charlotte, N.C.

The thickness of the sheet material which forms the backing of the pressure sensitive tape is largely dependent on the desired use. It is preferred that each of webs 11 and 22 be from about 0.0015 inch to about 0.012 inch (0.0381 mm to about 0.305 mm) in thickness. The final thickness of the backing is a function of the pressures used in the rolls of the fabric-making process, i.e. calender rolls, embossing roll, etc. For use as a medical tape, it is preferred that the backing have a final thickness between about 0.006 inch and 0.015 inch (0.152 mm to about 0.381 mm). As will be discussed in more detail in the examples below, the web, which is a product of the process disclosed herein, results in a backing exhibiting superior tensile and elongation properties over prior art backings comprised of a single-layered web or laminates of comparable thickness.

A wide variety of binder solutions can be applied to the web via applicators 16 and 24. Since absorbent and non-absorbent fibers may be utilized in the sheet material construction, it is required that the binder 19 have an affinity for the selected fibers. Examples of useful binders include acrylics, vinyl acrylics, acetate/ethylene, polyvinyl acetate, polyester, which are rewettable and which may be processed into crosslinked form. A preferred binder is an acrylic emulsion sold under the brand name "Nacrylic X4460" by National Starch Company of Bridgewater, N.J. A feature of this preferred binder is its ability to wet itself from layer to layer during manufacture. For example, when applying the second layer, the binder emulsion is able to wet the dried binder already present on the first layer. The result is that the second layer is bound to the first layer by the same fiber-binder-fiber bonds that bind all the fibers of the fabric together. There is no discontinuity of bond type such as might cause the layers to delaminate easily. This is particularly distinct from prior art laminates, where the composite is inhomogeneous, and discontinuities in the fiber to fiber bonds exist over the laminated face.

As shown in FIG. 1, the binder may be applied to the rolls by dipping the lower surface of the bottom roll into a trough containing the binder emulsion. Alternatively, it may be applied by a top roll as shown in applicator 24. Spray or foam coating techniques, which are generally known to the art, can also be used to apply the binder. For convenience, excess binder emulsion may be made available to the advancing web by the aforementioned application methods. The web will absorb as much liquid as physically possible with the excess being metered off.

The composite sheet material 10 may be further processed from stock roll 32 by the addition of a primer layer, a low adhesion backsize and a pressure sensitive adhesive layer. These layers are applied by roll coat, Meyer bar or other methods well known in the art. The presently preferred adhesive coat for use in medical tapes in a copolymer of isooctyl acrylate/acrylic acid (94/6) coated to a dry thickness of about 0.0025 inch. In the case of certain tapes, bacteriostatic agents and other active agents maybe incorporated into the web during the forming process or by further processing the roll stock web. It may also be desirable in some tapes to add a water-impermeable backing such as polyethylene to the side of the tape backing opposite the side on which the adhesive layer is coated.

It will be appreciated that some variation can occur in the production of the new backing. For example, one skilled in the art of making nonwoven webs will appreciate the variables inherent in the operation of web-making equipment, and in the control of the thickness and density of webs by the choice of web-making equipment and in the subsequent rolling, calendaring, and embossing steps. A better understanding the invention will be obtained in the review of the following non-limiting examples.

The tensile strength and elongation of the backing materials disclosed in the following examples, unless otherwise indicated, were measured using an INSTRON® Model TM-5 tensile tester (sold by Instron Corp. of Canton, Mass.) in accordance with ASTM test method D-1117. This apparatus was also used to measure the tear properties of the sheet material. For the tear test, the tensile tester was equipped with a two-piece jig designed to simulate the action of the human fingers when taking a piece of fabric between the thumb and index finger of one hand, holding it in similar manner a short distance away with the thumb and index finger of the other hand, and tearing the tape by moving the hands apart from each other at right angles to the plane of the fabric. The jig, when placed in the jaws of the INSTRON® machine, measures the tearing force (in pounds tensile) as the crosshead of the machine is retracted. The jib may be generally described as having a first piece consisting of a body and an arm at approximately 45° to the body. A plate is removably attached to the body by a nut and bolt. One end of the test sample (i.e., a 1"×3½" piece of sheet material) is clamped between the plate and body. The second piece of the jig has a body, arm, plate and clamping means complementary to the first part except the arm is at approximately 90° to the body, and the other end of the test sample is clamped to this piece. In testing, the bodies of the two parts of the jig are started about ⅛" apart with the fabric clamped in at a slight tension. The two parts of the jig then are pulled apart by the jaws of the INSTRON® machine exerting a twisting type tearing force on the fabric.

The softness and drape of the sheet material was measured according to the INDA Standard Test IST 90-75 (R77) Ring and Rod method modified to accomodate a smaller sample. The test apparatus consists of two parts, which fit between the two jaws of an INSTRON® tensile tester and which are designed to draw apart. The upper part is in the form of an open-sided cage, with a solid floor provided with a central ¾" hole. The lower part is a rod with a removable cap of 7/16" diameter. The rod moves in a vertical plane through the center of the hole in the cage. At the start of the test, a disc of the test fabric, 1⅛" in diameter, was placed on the rod, pierced through its center and held in place by the cap. The rod was withdrawn through the hole and the force was measured as the test fabric was folded around the cap.

EXAMPLE 1

Using a Model 12 BS Rando-Web machine, a nonwoven fabric was made from 1.5 denier, 1.5" rayon fibers (sold by Avtex Inc. of New York) and Nacrylic 4460 and acrylic binder (sold by National Starch Co. of Bridgewater, N.J.) which was applied as an aqueous emulsion (concentration: 30% solids) by means of coater rolls situated after the web-forming station and before the drying station. Conventional operating procedures were used throughout. After drying at 145° C. for 4 min., the fabric had a fiber weight of 12 lbs./ream and a total weight of 25 lbs./ream. Its thickness was 6 mils as made, 5.5 mls. after embossing. Fiber orientation (machine direction/cross direction, MD/CD) as determined by measurement of tensile strength was 1.6/1. Tensile strength in the machine direction was 7.7 lbs./in. as made, 9.3 lbs./in. after embossing. Elongation (%) at 1 lb., 2 lbs., 5 lbs., and breaking loads was 0.75, 2.25, 4.0 and 19.0 respectively. Porosity (ASTM test method D-726) was below 2 secs./100 ml on the Gurley Densometer. The machine direction tear was 1.5 lbs. The cross direction tear, 1.0 lbs. The softness was 34 gm. The test methods were those described above and the data are tabulated in Table 1.

EXAMPLE 2

A web of the fabric of Example 1 was conjoined with a web of the same fiber composition emerging from the web-forming station of a Rando-Web Model 12 BS machine. Both webs then passed in laminar fashion through the nip of coater rolls bearing 30% Nacrylic 4460 binder emulsion, and proceeded through the drying station.

The new fabric had the properties set forth in Table 1.

EXAMPLE 3

Using the procedure of Example 1, a nonwoven fabric was made from 1.5 denier, 1.5" rayon fibers, using approximately double the quantities used in Example 1. A fabric was made having about the same weight as that of Example 2. The properties of this fabric are listed in Table 1.

EXAMPLES 4 TO 21

Examples 4 to 21, summarized in Table 1, illustrate fabrics of this invention made from different fibers using the Rando-Web machine according to the process of the invention illustrated in Examples 1 and 2.

EXAMPLES 22 TO 26

Examples 22 to 26 demonstrate the higher MD/CD ratio obtained when using a Garnett machine rather than the Rando-Web. These higher ratios reflect the characteristic of the Garnett machine to lay a significantly greater than random proportion of the fibers in the machine direction.

EXAMPLES 25 TO 32

Examples 25 to 32 illustrate the use of different binders in making the non-woven fabrics of the invention.

TABLE 1

| Ex. # | Fiber or Blend | Binder | Plies | Weight (lbs./ream) Fiber | Weight (lbs./ream) Total | Thickness mils. | Tensile Strength MD/CD | Tensile Strength MD/- lbs./in. | Elongation (%) @load 1 lb. | 2 lb. | 5 lb. | Break | Porosity | Tear (lbs) MD | Tear (lbs) CD | Softness (grams) |
|---|---|---|---|---|---|---|---|---|---|---|---|---|---|---|---|---|
| 1 | Rayon 1.5 den. 1.5 in. | 4460[5] | 1 | 12 | 25 | 6 | 1.6/1 | 7.7 | 0.75 | 2.25 | 4.0 | 19.0 | <2 sec. per 100 cc | 1.5 | 1.0 | 34 |
| 2 | Rayon 1.5 den. 1.5 in. | " | 2 | 27 | 56 | 15 | 1.3/1 | 20.1 | 1.0 | 4.5 | 8.5 | 21.0 | " | 5.1 | 6.6 | 104 |
| 3 | Rayon 1.5 den. 1.5 in. | " | 1 | 25 | 55 | 13 | 1.3/1 | 8.5 | 0.5 | 2.3 | 4.3 | 23.0 | " | 1.6 | 2.4 | 39 |
| 4 | Polyester[2] 1.75 den. 1.5 in. | 4460 | 1 | 11.4 | 24 | | 2.0/1 | 6.0 | | | | 24 | " | 1.9 | 2.0 | |
| 5 | Polyester[2] 1.75 den. 1.5 in. | " | 2 | 23 | 49 | | 1.9/1 | 14.5 | 1.9 | 3.0 | 4.8 | 32 | " | 2.7 | 4.5 | 24–30 |
| 6 | Polyester[2] 1.75 den. 1.5 in. | " | 1 | 22 | 46 | | 2.0/1 | 10.6 | | | | 29 | " | 2.7 | 4.3 | |

TABLE 1-continued

| Ex. # | Fiber or Blend | Binder | Plies | Weight (lbs./ream) Fiber | Weight (lbs./ream) Total | Thickness mils. | Tensile Strength MD/CD | Tensile Strength MD/lbs./in. | Elongation (%) @load 1 lb. | 2 lb. | 5 lb. | Break | Porosity | Tear (lbs) MD | Tear (lbs) CD | Softness (grams) |
|---|---|---|---|---|---|---|---|---|---|---|---|---|---|---|---|---|
| 7 | Cotton[3] | 4460 | 1 | 11 | 23 | 4 | 1.2/1 | 2.8 | 0.3 | 1.3 | 2.3 | 10 | " | 0.5 | 0.8 | 38 |
| 8 | " | " | 2 | 23 | 45 | 7 | 2.0/1 | 8.3 | 0.6 | 2.5 | 5.0 | 13 | " | 0.7 | 0.5 | 38 |
| 9 | " | " | 1 | 22 | 44 | 9 | 1.6/1 | 10.0 | 1.0 | 4.3 | 8.0 | 13 | " | 2.3 | 3.4 | 41 |
| 10 | Polyester Type 310 (85%) 1.8 den. 1.5 in. Polyester Type 450 (15%) 3.0 den. 1.5 in. | 4460 | 1 | 13 | 27 | 9 | 1.7/1 | 6.2 | 0.5 | 1.6 | 2.5 | 21 | " | 2.0 | 2.8 | 33 |
| 11 | Polyester Type 450 (15%) 3.0 den. 1.5 in. | " | 2 | 27 | 55 | 18 | 1.8/1 | 16.0 | 1.0 | 2.0 | 3.9 | 32 | " | 2.6 | 4.8 | 38 |
| 12 | Polyester Type 450 (15%) 3.0 den. 1.5 in. | " | 1 | 23 | 47 | 15 | 1.9/1 | 12.0 | 0.7 | 1.6 | 2.8 | 31 | " | 2.3 | 3.5 | 51 |
| 13 | Polyester Type 310 (42%) 1.8 den. 1.5 in. Rayon (42%) 1.5 den. 1.5 in. Polyester Type 450 (16%) 3.0 den. 1.5 in. | 4460 | 1 | 15 | 28 | | 2.1/1 | 5.1 | | | | 14 | " | | | |
| 14 | Polyester Type 450 (16%) 3.0 den. 1.5 in. | 4460 | 2 | 30 | 57 | | 2.2/1 | 11.4 | | | | 15 | " | 3.7 | 5.1 | 31–38 |
| 15 | Polyester Type 450 (16%) 3.0 den. 1.5 in. Acrylic[4] Type 16 (85%) 2.0 den. 1.5 in. | 4460 | 1 | 24 | 52 | | 2.2/1 | 8.4 | | | | 21 | " | 2.6 | 4.5 | |
| | Polyester 450 3.0 den. 1.5 in. | 4460 | 1 | 12 | 25 | | | 2.6 | | | | 8 | " | 0.8 | 0.9 | |
| 17 | Acrylic[4] Type 16 (85%) 2.0 den. 1.5 in. Polyester 450 3.0 den. 1.5 in. | 4460 | 2 | 24 | 54 | | | 4.0 | | | | 10 | " | 1.2 | 1.4 | 27–35 |
| 18 | Acrylic[4] Type 16 (85%) 2.0 den. 1.5 in. Polyester 450 3.0 den. 1.5 in. Rayon | 4460 | 1 | 20 | 40 | | | 3.3 | | | | 10 | " | 1.1 | 1.4 | |

TABLE 1-continued

| Ex. # | Fiber or Blend | Binder | Plies | Weight (lbs./ream) Fiber | Weight (lbs./ream) Total | Thickness mils. | Tensile Strength MD/CD | Tensile Strength MD/lbs./in. | Elongation (%) @load 1 lb. | Elongation (%) @load 2 lb. | Elongation (%) @load 5 lb. | Elongation (%) @load Break | Porosity | Tear (lbs) MD | Tear (lbs) CD | Softness (grams) |
|---|---|---|---|---|---|---|---|---|---|---|---|---|---|---|---|---|
|  | (50%) 1.5 den. 1.5 in. | 4460 | 1 | 12 | 24 |  |  | 4.5 |  |  |  | 8 | " | 1.5 | 3.4 |  |
| 19 | Polyester Type 310 (50%) 1.8 den. 1.5 in. |  |  |  |  |  |  |  |  |  |  |  |  |  |  |  |
| 20 | Rayon (50%) 1.5 den. 1.5 in. | 4460 | 2 | 24 | 50 |  | 1.8/1 | 8.8 |  |  |  | 13 | <2 sec/100cc | 3.0 | 5.1 | 36–41 |
|  | Polyester Type 310 (50%) 1.8 den. 1.5 in. |  |  |  |  |  |  |  |  |  |  |  |  |  |  |  |
| 21 | Rayon (50%) 1.5 den. 1.5 in. | 4460 | 1 | 22 | 46 |  | 1.9/1 | 7.7 |  |  |  | 14 | " |  |  |  |
|  | Polyester Type 310 (50%) 1.8 den. 1.5 in. |  |  |  |  |  |  |  |  |  |  |  |  |  |  |  |
| 22 | Polyester 1.8 den. 1.5 in. | 4460 | 1 | 12 | 25 | 5 | 6.8/1 | 6.5 |  |  |  | 20 | " |  |  |  |
| 23 | Polyester 1.8 den. 1.5 in. | 4460 | 2 | 24 | 51 | 10 | 7/1 | 15.5 | 1.2 | 3.9 | 5.4 | 32 | " | 4.2 | 12.0 | 21–27 |
| 24 | Polyester 1.8 den. 1.5 in. | 4460 | 1 | 22 | 45 | 9.5 | 5.8/1 | 8.6 |  |  |  | 23 | " |  |  |  |
| 25 | Polyester 1.8 den. 1.5 in. | —3163[6] | 1 | 11 | 17 | 8.7 | 4.9/1 | 5.0 |  |  |  | 30 | " |  |  |  |
| 26 | Polyester 1.8 den. 1.5 in. | " | 2 | 22 | 37 | 5.0 | 4.1/1 | 9.0 |  |  |  | 22 | " |  |  |  |
| 27 | Polyester Type 310 (85%) 1.8 den. 1.5 in. | B-15[7] | 1 | 11 | 22 | 9 | 1.3/1 | 8.0 | 0.25 | 0.75 | 1.0 | 60 | " | 2.9 | 3.4 | 12 |
|  | Polyester Type 450 (15%) 3.0 den. 1.5 in. |  |  |  |  |  |  |  |  |  |  |  |  |  |  |  |
| 28 | Polyester Type 310 (85%) 1.8 den. 1.5 in. | " | 2 | 22 | 46 | 18 | 1.4/1 | 15.0 | 1.5 | 4.5 | 6.5 | 48 | " | 8.2 | 6.2 | 36 |
|  | Polyester Type 450 (15%) 3.0 den. 1.5 in. |  |  |  |  |  |  |  |  |  |  |  |  |  |  |  |
| 29 | Polyester Type 310 1.8 den. 1.5 in. | " | 1 | 21 | 45 | 18 | 1.5/1 | 8.0 | 1.5 | 3.0 | 4.0 | 51 | " | 5.8 |  | 44 |
|  | Polyester Type 450 (15%) 3.0 den. |  |  |  |  |  |  |  |  |  |  |  |  |  |  |  |

TABLE 1-continued

| Ex. # | Fiber or Blend | Binder | Plies | Weight (lbs./ream) Fiber | Weight (lbs./ream) Total | Thickness mils. | Tensile Strength MD/CD | Tensile Strength MD/- lbs./in. | Elongation (%) @load 1 lb. | Elongation (%) @load 2 lb. | Elongation (%) @load 5 lb. | Elongation (%) @load Break | Porosity | Tear (lbs) MD | Tear (lbs) CD | Softness (grams) |
|---|---|---|---|---|---|---|---|---|---|---|---|---|---|---|---|---|
| 30 | 1.5 in. Cotton | B-15 | 1 | 11 | 20 | 5 | 1.2/1 | 4.2 | 0.5 | 1.3 | 2.0 | 13 | " | 0.5 | 1.5 | 10 |
| 31 | " | " | 2 | 23 | 41 | 7 | 1.6/1 | 9.0 | 0.6 | 2.0 | 4.0 | 23 | " | 2.0 | 1.3 | 35 |
| 32 | " | " | 1 | 23 | 41 | 8 | 1.4/1 | 7.6 | 0.7 | 2.5 | 5.0 | 16 | " | 1.0 | 2.5 | 42 |

NOTE: Suppliers of Materials listed in Table 1.

| Material | Supplier |
|---|---|
| [1] Rayon fiber | Avtex inc. 1185 Av of the Americas, N.Y., NY 10036 |
| [2] Polyester fiber | Celanese Co. 1121 Av of the Americas, N.Y., NY 10036 |
| [3] Cotton, yarn grade | West Point-Pepperill Langdale, Alabama |
| [4] Acrylic fiber | Monsanto Co. 800 North Lindberg Blvd., St. Louis, MO 63116 |
| Acrylic binder | |
| [5] X-4460 | National Starch Co. 10 Findern Av, Bridgewater, NJ 08807 |
| [6] BX-3163 | Union Carbide Corp. 270 Park Av, N.Y., NY 10017 |
| [7] B-15 | Rohm and Haas Co. Independence Mall W., Philadelphia, PA 19105 |

From Table 1 it can be seen that the fabrics of this invention (the two-ply examples in the table) generally exhibit significantly greater strength than fabrics made from the same amount (within experimental variation) of the same components by prior art means, i.e., in one ply. This is more pronounced in the case of fabrics made from synthetic fibers than those made from natural fibers. In examples 1 through 29 this is true for all the synthetics. It is noted that for cotton (e.g., examples 7 to 9) there was not a substantial increase. It is believed that this is a function of the binder used.

EXAMPLE 33

To the fabric of Example 11, a conventional urethane low adhesion backsize was first applied to the embossed side, using a roll applicator similar to that depicted by no. 16 (FIG. 1), followed by air drying. The other face was coated with a pressure sensitive adhesive, a copolymer of iso-octyl acrylate (94%) and acrylic acid (6%), making direct application using a standard reverse roll coater at a wet coating thickness of 0.0095 inches (0.24 mm), followed by drying in an air circulating oven for 4 minutes at 95° C.

The resulting adhesive sheet was slit into strips 1 inch wide, using standard slitting technique, to give 1 inch samples of surgical adhesive tape.

Although it is a subjective quality, the appearance of the new fabrics of the invention is significantly more pleasing to the eye than corresponding fabrics of the prior art. In general the appearance of the typical single-ply, dry-process nonwoven fabric is slightly uneven because of the random distribution of the fibers across the web. In cases where care has not been taken to separate the starting fibers thoroughly before putting them through the maker (e.g., the Rando-Webb machine), small aggregates can come through and cause blemishes in the product. Even when good care is exercised, an incipient mottled appearance can often be discerned by the eye, especially in thin nonwovens such as those suitable for tape backings. A feature of the new fabrics is that they appear much smoother in texture and more homogeneous than those of the prior art.

What is claimed is:

1. A conformable pressure-sensitive adhesive tape comprised of a sheet material and a pressure-sensitive adhesive thereon, said sheet material comprising a first layer of a nonwoven web of randomly interlaced fibers, bonded to each other by a rewettable binder dispersed therethrough, and at least one additional layer comprising a nonwoven web of randomly interlaced fibers having a rewettable binder dispersed therethrough, said fiber of said additional layer being laid directly on said first layer prior to adding said binder to said additional layer whereby said binder in said additional layer bonds the interlaced fibers of said additional layer to each other and to the fibers of said first layer whereby said layers are not readily separable across their common surfaces.

2. A conformable sheet material comprising a first layer of a nonwoven web of randomly interlaced fibers bonded to each other by a rewettable binder dispersed therethrough, and at least one additional layer of a nonwoven web of randomly interlaced fibers having a rewettable binder dispersed therethrough, said fibers of said additional layer being laid directly on said first layer prior to adding said binder to said additional layer whereby said binder in said additional layer bonds the interlaced fibers of said additional layer to each other and to the fibers of said first layer whereby said layers are not readily separable across their common surfaces.

3. The article of claim 1 or 2 wherein said layers are compacted after said fibers of said additional layer are bonded to the fibers of said first layer.

4. The article of claim 3 wherein said layers are embossed during compacting.

5. The article of claim 3 wherein the total thickness of said layers is between about 0.006 and 0.015 inch.

6. The article of claim 1 or 2 wherein said fibers comprise a combination of synthetic staple fibers and binder fibers.

7. The article of claim 6 wherein said fibers are a blend comprised of 85% by weight 1.5 inch long polyester staple fibers having 1.8 denier and 15% by weight 1.5 inch long polyester binder fibers having 3.0 denier.

8. The article of claim 1 or 2 wherein said binder is an acrylic emulsion.

9. A process of making a conformable sheet material comprising the steps of
  (a) forming a first layer of a nonwoven web of randomly interlaced fibers bonded to each other by a rewettable binder dispersed therethrough;
  (b) laying at least one additional layer of a nonwoven web of randomly interlaced fibers directly of said first layer;
  (c) dispersing a rewettable binder through said additional layer whereby said binder bonds the interlaced fibers of said additonal layer to each other and to the fibers of said first layer; and
  (d) drying said sheet to remove solvent from said binder;
whereby said layers of resulting sheet material are not readily separable across their common surfaces.

10. The process according to claim 9 further comprising the step of compacting said layers after said drying step (d).

11. The process according to claim 10 wherein said layers are compacted to a thickness between about 0.006 and 0.015 inch.

* * * * *